United States Patent
Wise et al.

(10) Patent No.: US 10,352,438 B1
(45) Date of Patent: Jul. 16, 2019

(54) VEHICLE PROPULSION SYSTEM AND METHOD FOR CONTROLLING A VEHICLE PROPULSION SYSTEM

(71) Applicant: GM GLOBAL TECHNOLOGY OPERATIONS LLC, Detroit, MI (US)

(72) Inventors: William Wise, Novi, MI (US); Jeffrey N. Trush, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/924,369

(22) Filed: Mar. 19, 2018

(51) Int. Cl.
*F16H 61/02* (2006.01)
*F16H 59/18* (2006.01)
*F16H 59/48* (2006.01)
*F16H 59/44* (2006.01)
*F16H 59/54* (2006.01)
*F16H 59/58* (2006.01)
*F16H 59/36* (2006.01)

(52) U.S. Cl.
CPC ......... *F16H 61/0213* (2013.01); *F16H 59/18* (2013.01); *F16H 59/44* (2013.01); *F16H 59/48* (2013.01); *F16H 59/54* (2013.01); *F16H 59/58* (2013.01); *F16H 2059/366* (2013.01); *F16H 2061/0223* (2013.01)

(58) Field of Classification Search
None
See application file for complete search history.

(56) References Cited

U.S. PATENT DOCUMENTS

| | | |
|---|---|---|
| 8,099,220 B2 | 1/2012 | Kim et al. |
| 8,290,666 B2 | 10/2012 | Turski et al. |
| 8,403,812 B2 | 3/2013 | Turski et al. |
| 9,297,455 B2 | 3/2016 | Li |
| 9,303,759 B2 | 4/2016 | Jeon et al. |
| 2017/0082191 A1* | 3/2017 | Mullen ............... F16H 61/0213 |

* cited by examiner

*Primary Examiner* — Justin Holmes (57) ABSTRACT

A vehicle propulsion system includes an engine for generating torque for propelling the vehicle, a transmission selectively coupled to the engine for receiving torque from the engine and having a plurality of gear selections each of which have a gear ratio which converts the torque from the engine to an output torque, a vehicle location identifier that identifies a location of the vehicle and provides a vehicle location signal indicating a location of the vehicle, and a controller that is programmed to record a shift history comprising gear selection, duration of gear selection, and vehicle location of each gear selection, identify a gear selection having a duration less than a predetermined duration, and revise a shift parameter for a gear selection having a duration less than the predetermined duration.

20 Claims, 5 Drawing Sheets

VEHICLE PROPULSION SYSTEM AND METHOD FOR CONTROLLING A VEHICLE PROPULSION SYSTEM

FIELD

The present disclosure relates to a vehicle propulsion system and method for controlling a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle propulsion systems include a transmission that converts torque from one or more spinning shafts into torque on one or more spinning shafts. A transmission may utilize discrete gear states to accomplish the various torque transmission and conversion functions required. Transmission shifts include a disengagement of a first clutch, interrupting the torque delivered through the transmission, and then an engagement of a second clutch, reestablishing the torque delivered through the transmission. Accordingly, a transmission shift may include an interruption to the torque provided through the transmission potentially creating undesirable drivability and/or an unsettling of the vehicle on the road surface.

While a transmission shift may be necessary based upon operating conditions of the vehicle, circumstances may arise where a transmission shift, may be unnecessary and/or undesirable. One instance impacting the necessity of transmission shifts includes an upshift occurring just prior to an imminent slowing of the vehicle which may not have been anticipated by a transmission controller, but results in a downshift immediately following the upshift.

The effect of a transmission shift for a performance vehicle operating on race track may be particularly critical. A high performance vehicle operating on a race course may be operating at or close to the limit of the ability of the vehicle to maintain traction between its tires and the surface of the track on which it is travelling. An improperly timed transmission shift may upset the vehicle, may adversely affect the intended path as defined by driver inputs, exceed the adhesion/traction limit(s) of the tires to the track, and may adversely impact the overall speed with which the vehicle is capable of traversing the course, thereby potentially increasing lap times.

SUMMARY

In an exemplary aspect, a vehicle propulsion system includes an engine for generating torque for propelling the vehicle, a transmission selectively coupled to the engine for receiving torque from the engine and having a plurality of gear selections each of which have a gear ratio which converts the torque from the engine to an output torque, a vehicle location identifier that identifies a location of the vehicle and provides a vehicle location signal indicating a location of the vehicle, and a controller that is programmed to record a shift history comprising gear selection, duration of gear selection, and vehicle location of each gear selection, identify a gear selection having a duration less than a predetermined duration, and revise a shift parameter for a gear selection having a duration less than the predetermined duration.

In this manner, short duration upshifts may be minimized and/or prevented, thereby avoiding potentially upsetting a vehicle, avoiding adversely impacting the intended path of the vehicle as defined by driver input(s), distracting a driver, improving overall performance of the vehicle and lowering lap times.

In another exemplary aspect, the shift parameter is based upon one of an engine speed, vehicle speed, a vehicle acceleration, an accelerator pedal position, a brake pedal position, and a steering angle input.

In another exemplary aspect, the shift parameter includes an engine speed.

In another exemplary aspect, the controller identifies having a duration less than a predetermined duration by identifying a gear selection that reduces a gear ratio and which has a duration less than a predetermined duration before a gear selection that increases a gear ratio.

In another exemplary aspect, revising a shift parameter includes providing a shift parameter revision in the shift history corresponding to a vehicle location of the identified gear selection having a duration less than the predetermined duration.

In another exemplary aspect, the controller is further programmed to determine when the vehicle location returns to the identified vehicle location corresponding to the shift parameter revision, revise a shift parameter based upon the shift parameter revision while the vehicle is at the identified vehicle location corresponding to the shift parameter revision, and control a gear ratio selection in the transmission based upon the revised shift parameter while the vehicle is at the identified vehicle location corresponding to the shift parameter revision.

In another exemplary aspect, shift parameter revision includes an engine speed offset value.

In another exemplary aspect, the engine speed offset value is less than a difference between an engine speed shift point and an engine speed rev limit.

In another exemplary aspect, the controller is further programmed to calculate the engine speed offset value based upon one of a vehicle speed, engine speed, gear ratio, and duration of the gear selection.

In another exemplary aspect, the controller is further programmed to determine whether the vehicle is in a predetermined performance mode and wherein the controller records a shift history, identifies gear selections, and revises shift parameters only when the controller determines that the vehicle is in the predetermined performance mode.

In another exemplary aspect, the vehicle location identifier includes a receiver of a global positioning system.

In another exemplary aspect, the controller is further programmed to initiate recording of the shift history in response to a driver input.

In another exemplary aspect, the vehicle location identifier includes a vehicle transponder configured to identify a position of the vehicle on a track.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
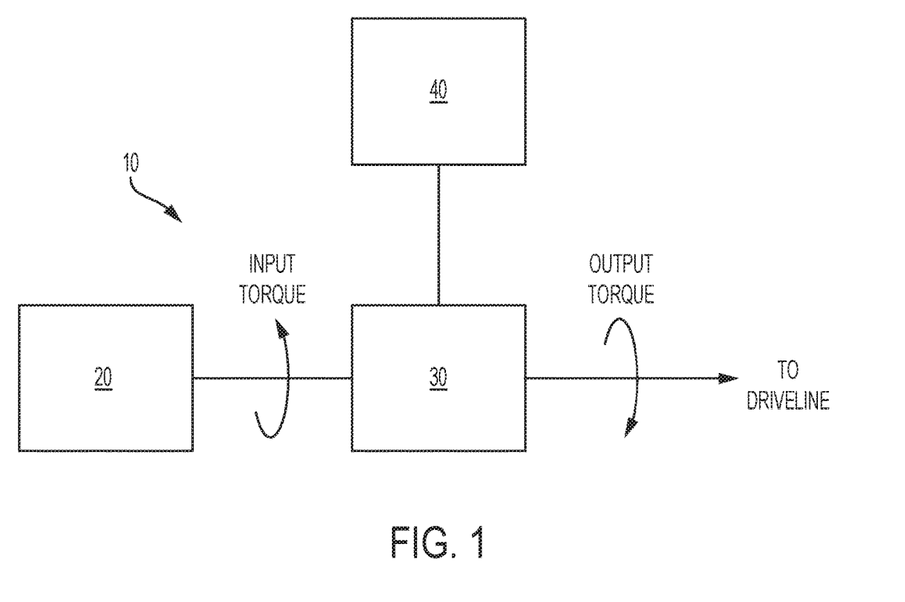
FIG. 1 is a schematic representation of a vehicle propulsion system.

Referring now to the drawings, wherein the showings are for the purpose of illustrating certain exemplary embodiments only and not for the purpose of limiting the same, FIG. 1 schematically depicts an exemplary vehicle propulsion system, illustrating a relationship between input torque and output torque applied through a transmission, in accordance with the present disclosure. Vehicle 10 includes an engine 20, a transmission 30, and a transmission control module 40. Under normal operation, including vehicle acceleration, steady state operation, or gradual deceleration, the engine 20 supplies an input torque to the transmission 30, and the transmission 30 converts the input torque, through a gear ratio internal to the transmission and, in an automatic transmission, through a torque converter, into an output torque, powering the driveline of vehicle 10. While the present exemplary embodiment may include an automatic transmission, the present disclosure is useful with any type of transmission without limitation, including, for example, a dual clutch transmission and/or any transmission system that automatically selects gears. The engine provides input torque required to meet a torque demand in relation to the output torque. The transmission control module 40 monitors operation of transmission 30 and other inputs from vehicle 10 and issues transmission shift commands to transmission 30 in order to effect transmission shifts.

The effect of output torque upon the driveline is a function of the operational conditions of the vehicle and the available traction between the vehicle tires and the road surface on which the vehicle is operating. The magnitude of the output torque, as may be limited by the available traction, determines the magnitude of a propelling force upon the vehicle. As will be appreciated by one having ordinary skill in the art, the velocity and acceleration of an object are a result of the summation of forces acting upon the object. An object with balanced forces will not experience acceleration (including deceleration, or acceleration in a negative direction). An object with unbalanced forces will accelerate in the direction dictated by the larger force. In addition to propelling force applied by the output torque, a number of other forces act upon a vehicle, including gravitational force, drag force, and frictional forces.

Figure 2:
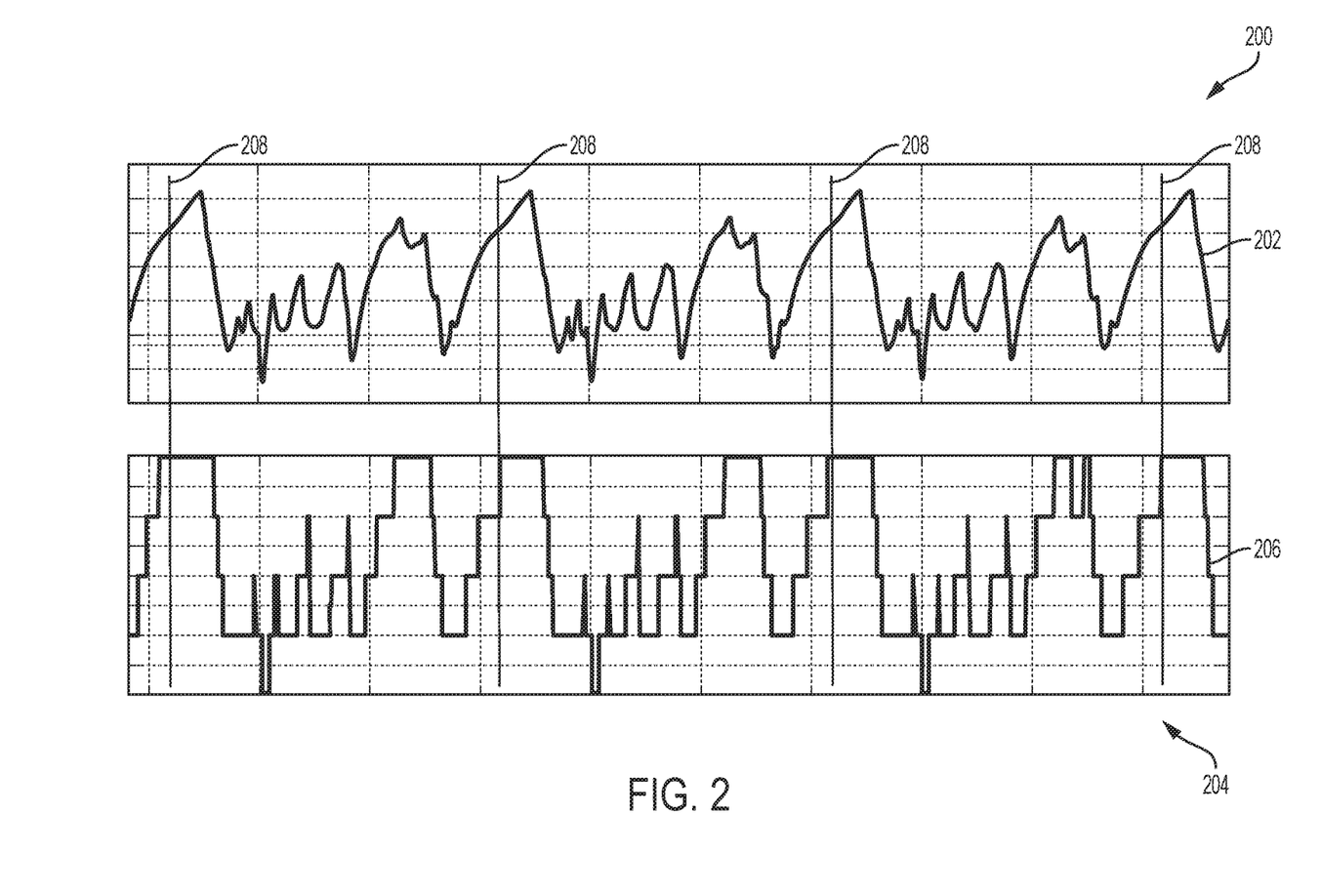
FIG. 2 illustrates graphs of a vehicle speed and gear selection for a vehicle lapping a road course.

FIG. 2 illustrates a graph 200 of a vehicle speed 202 and a graph 204 of a gear selection 206 as a vehicle repeatedly laps a road course. Vertical lines 208 extending across both graphs 200 and 204 indicate times at which the vehicle returns to a location on the road course. The location 208 may correspond to a start/finish for the road course. FIG. 2 clearly illustrates an identifiable and repeating pattern of vehicle speed 202 and gear selection 206 as the vehicle repeatedly laps the road course. The transmission controller 40 controls the gear selection 206 based, at least in part, on the vehicle speed 202.

Figure 3:
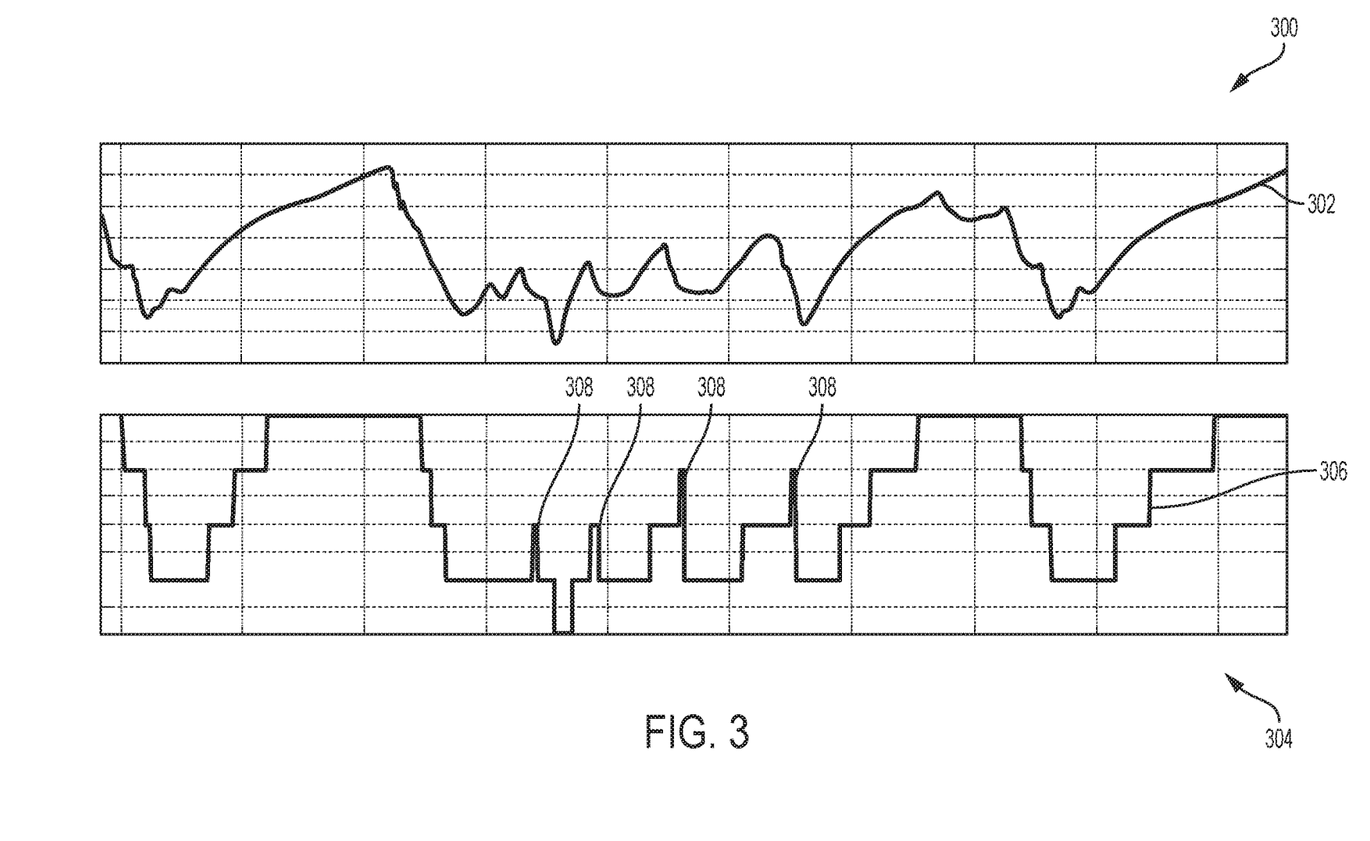
FIG. 3 illustrates a portion of the graphs of FIG. 2.

FIG. 3 illustrates graphs similar to those of FIG. 2, but only illustrates a single instance of the repeating pattern (i.e. corresponding to a single lap of the road course). Graph 300 includes a plot of vehicle speed 302 and graph 304 includes a plot of gear selection 306. Graph 304 clearly illustrates four instances 308 in which the gear selection 306 upshifts for a very short period of time before immediately downshifting. Each of those instances 308 generally corresponds to a point on graph 300 where vehicle speed 302 is decreasing. The gear selection represented in FIGS. 2 and 3 are determined with systems and methods which rely upon a number of vehicle inputs such as, for example, vehicle speed, engine speed, lateral acceleration and the like.

Figure 4:
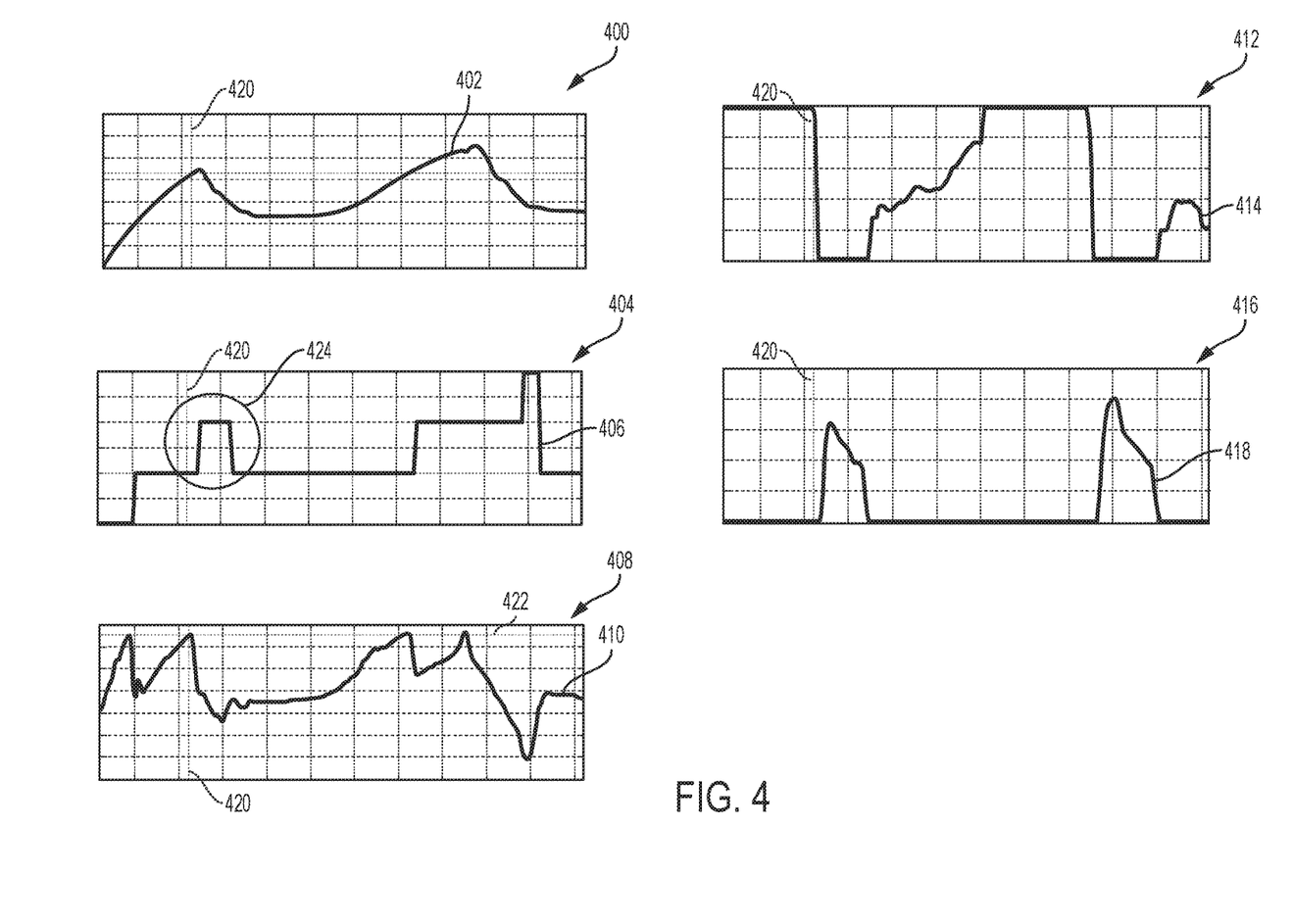
FIG. 4 illustrates graphs of vehicle speed, gear selection, engine speed, accelerator pedal position; and brake pedal position where a short period upshift occurs as a vehicle enters a corner on a road course.

FIG. 4 illustrates multiple graphs of vehicle signals for one of the upshifts 308 from FIG. 3. Graph 400 illustrates vehicle speed 402, graph 404 illustrates gear selection 406, graph 408 illustrates engine speed 410, graph 412 illustrates accelerator pedal position 414, and graph 416 illustrates brake pedal position 418. Graph 408 also includes a vertical line 420 corresponding to an instant in time where the engine speed 410 reaches a predetermined threshold 422. In response to the engine speed 410 reaching the predetermined threshold 422, the transmission control module 40 commands the transmission 30 to upshift. The predetermined threshold 422 is typically selected to correspond to an engine speed which is less than a higher speed threshold at which an engine fuel cutoff would occur (also known as a "rev limit"). A rev limit may generally be selected to correspond to an engine speed which is lower than a speed at which engine damage may occur should the engine speed exceed the rev limit. For example, in an exemplary engine having a rev limit of about 6,500 revolutions per minute (RPM) a transmission control module may command an upshift at about 6,250 RPM which is just below the rev limit. In this manner, the engine speed stays below the rev limit by a predetermined margin, which, in this example, is 250 RPM.

The vertical line 420 indicating the instant at which the engine speed 410 reaches the predetermined threshold speed 422 is illustrated on all of the graphs 400, 404, 408, 412, and 416 of FIG. 4. Shortly, after, and in response to the engine speed 410 reaching the predetermined threshold speed 422, and after being commanded to do so by the transmission control module, the transmission upshifts. This upshift is illustrated within the circle 424. However, even though the engine speed 410 increased sufficiently to trigger the upshift, by the time the upshift actually occurs or very shortly thereafter, the vehicle speed 402 has started to decrease (see graph 400). The cause of the vehicle speed 402 decrease may be illustrated in graphs 412 and 416, where almost immediately after the upshift is triggered at instant 420, the accelerator pedal position 414 drops substantially to zero, indicating a driver request for a reduction in propulsion system torque followed immediately thereafter by a brake pedal position 418 increase indicating a driver request to slow the vehicle.

The exemplary data illustrated in the graphs of FIG. 4 corresponds to an actual vehicle approaching and entering a corner of a road course. Just prior to entering the corner, the vehicle is accelerating and as the vehicle approaches the corner, the driver lifts off the throttle and applies the brakes. In response, a substantial portion of the weight of the vehicle transfers forward to the front tires which increases the friction between the front tires and the road surface. A preferred method for entering a corner in a road course may involve trail braking in which there is a rapid, but controllably gradual, application of the brakes while simultaneously, gradually increasing steering input as the vehicle enters the corner. This results in a controlled and gradual, slowing and rotation of the vehicle (or vehicle yaw) and lateral acceleration through the corner. The rotation of the vehicle through the corner and lateral acceleration results in a further transfer of the vehicle weight from one side of the vehicle to the other. This lateral weight transfer is toward the outside of the corner.

While the weight transfer described above may increase the friction available to some of the tires of the vehicle, there is a corresponding transfer of weight away from the tires at the rear of the vehicle and from the tires on the inside of the corner. The weight transfer away from these tires reduces the amount of traction that is available between these tires and the underlying road course surface. Under normal vehicle operating conditions, the vehicle accelerations applying forces to the tires are generally well below the traction limit of the tires. However, in a high performance operating condition, where the vehicle is experiencing higher accelerations, the forces applied to the tires may be much closer to the traction limit of those tires. In the situation illustrated by the graphs of FIG. 4, the very short upshift 424 occurs as the vehicle enters a corner and the torque change to the rear wheels as a result this upshift and immediate downshift may upset the vehicle and cause the unburdened tires to exceed their available traction limit which may result in an undesirable oversteer (excessive vehicle yaw) condition and may have an adverse impact on the overall drivability and/or controllability of the vehicle. Additionally, even in the absence of a vehicle upset condition, this short upshift followed by an immediate downshift may be noticed by a driver which may distract the driver from the complex task of controlling the vehicle in a high performance driving situation. As a result of this, very short upshift followed by an immediate downshift, may adversely impact overall lap times.

In an exemplary embodiment of the present disclosure, the vehicle propulsion system includes a controller that recognizes that the vehicle may be on a course where the vehicle undergoes a repeating pattern of operations based, at least in part, on location data, records a transmission shift history as the vehicle traverses the course and when the vehicle finishes a lap as indicated by location data, identifies any upshifts below a predetermined duration in the recorded history at a location, determines a shift offset value which increases the engine speed at which the identified upshift may next occur at the location, and applies that offset when the vehicle returns to that location.

Figure 5:
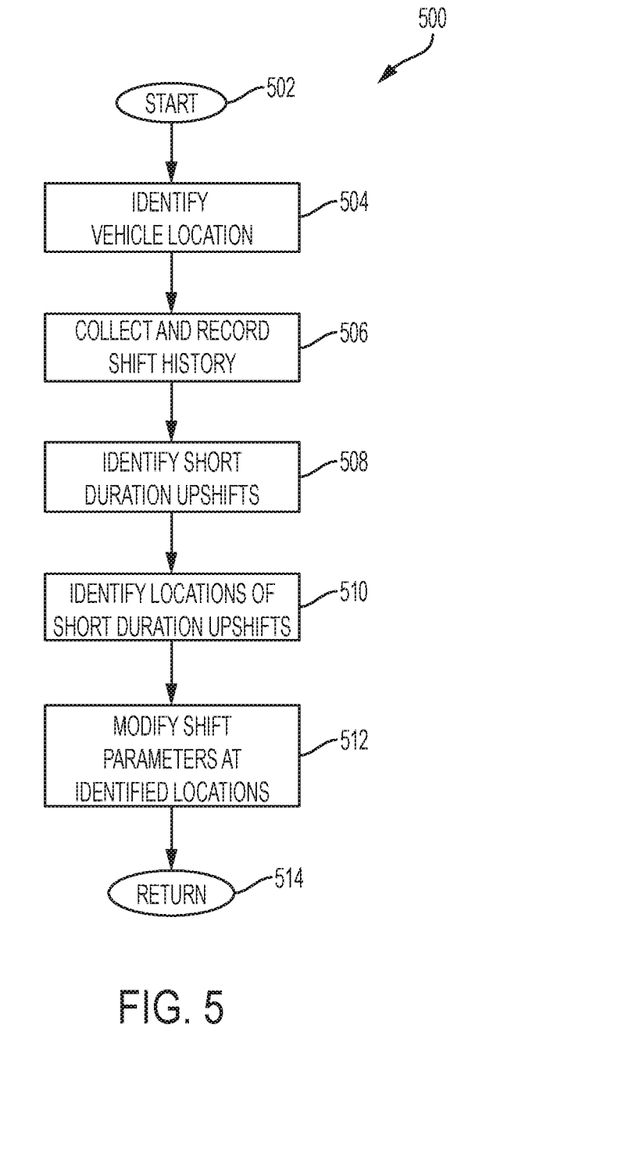
FIG. 5 is a flowchart of an exemplary method in accordance with the present disclosure.

FIG. 5 is a flowchart 500 of an exemplary method in accordance with the present disclosure. The method starts at step 502 and continues to step 504. In step 504 the controller identifies a vehicle location and continues to step 506. In step 506, the controller records shift information to create a shift history and continues to step 508. In step 508, the controller identifies any upshifts in the shift history having a duration less than a predetermined threshold duration and continues to step 510. In step 510, the controller identifies a location of any upshift having a duration less than a predetermined threshold duration and continues to step 512. In step 512, the controller modifies a shift parameter at the identified location and continues to step 514 where the method returns and/or continues.

Optionally, the method and control system of the present disclosure may operate contingent upon a performance driving mode being active. At least one application for the present disclosure is in a high performance vehicle operating in a performance mode and an exemplary embodiment may operate contingent upon being in the performance mode.

In an exemplary embodiment of the present disclosure, the vehicle may be able to identify the location of the vehicle with a system such as with, for example, a global positioning system (GPS). It is to be appreciated that other vehicle location identification systems may also be used with the present disclosure. For example, a race track may incorporate equipment at a start/finish position on the track which may also provide location data for the vehicle which may then be used in an exemplary embodiment of the present disclosure. Any system and/or method which may identify the location of the vehicle may be used with the present disclosure without limitation.

In an exemplary embodiment, the shift history may take the form of a table of vehicle data having a record of each shift. Each record in the shift history may include, for example, vehicle location, gear selection, duration of gear selection, and the like without limitation. The system and method may evaluate each record and, for any gear selection having a duration less than a predetermined duration, the system and method may modify a shift parameter. The shift parameter may be modified in any number of different manners without limitation.

In an exemplary embodiment, the corresponding record in the shift history may be supplemented with an engine speed offset value. Then on the next lap, as the vehicle traverses the track again, the transmission controller may then refer to the shift history table, including the engine speed offset value, and when the vehicle reaches the same location as the revised record, the engine speed offset value may then be added to a standard engine speed shift point so that the corresponding shift happens either at a higher engine speed or, perhaps, not at all, to completely avoid the vehicle upsetting shift. In this example, the shift parameter is the engine speed shift point. For example, for a vehicle having a standard engine speed shift point of about 6250 RPM, and an engine speed offset value of 100 RPM, at the corresponding vehicle location the transmission controller 40 may adjust the engine speed shift point from 6250 RPM to an engine speed shift point of 6350. In this manner, the upshift may be delayed and/or entirely avoided, which may reduce the possibility for upsetting the vehicle, distracting the driver, reducing drivability, and increasing lap times.

In an exemplary embodiment of the present disclosure, as the vehicle repeatedly laps the course, the system and method may continuously collect vehicle data, and update the shift history with the continuously collected data. Further, the system and method may iteratively and incrementally adjust the shift parameter or parameters. For example, for any short duration upshift identified in the shift history, the engine speed offset value may be increased incrementally by a predetermined amount each time the corresponding gear selection is identified as having a duration less than a predetermined duration. In this manner, over a series of laps around a course, the vehicle shifting may be incrementally, yet significantly improved, thereby improving drivability and lowering lap times.

The location data in the shift history may correspond to a vehicle location such as, for example, a GPS identified location, and/or a location in the sequence of shifts in the shift history. For example, in an exemplary method and system, if the fourth gear selection in the shift history is identified as having a duration less than a predetermined duration, then when the vehicle reaches the fourth gear selection in the next lap, the transmission controller uses the engine speed offset value (if any) for the fourth record in the shift history. Alternatively, if the shift history includes GPS location data for each gear selection record, then when the vehicle detects that the vehicle is approaching a GPS location corresponding to a record in the shift history having an engine speed offset value, then the transmission controller will use the engine speed offset value to modify the engine speed at which a shift may occur while adjacent that location. Subsequently to passing beyond that location, the vehicle may optionally return to a standard engine speed shift point and/or refer to the next record if appropriate.

In another exemplary embodiment, the system and method of the present disclosure may calculate an engine speed offset amount which ensures that any particular upshift selection having a duration below a predetermined duration does not happen on the next lap. That engine speed offset may be directly calculated based upon, for example, vehicle speed, the engine speed gap between the normal engine speed shift point and the rev limit engine speed, ratio before and the upshift, and the duration of the upshift to be removed from the next lap. As long as the sum of the calculated engine speed offset and the normal engine speed shift point does not exceed the rev limit, then the calculated engine speed offset may be applied during the very next lap and the undesirable upshift may be entirely avoided.

In an exemplary embodiment of the present disclosure, the system and method may store the revised shift pattern for subsequent use. For example, a shift program may be altered according to the present disclosure, stored and when the vehicle leaves the track, the vehicle may return to normal transmission control. Then when the vehicle determines that it has returned to the track, the vehicle recognizes a correspondence in current vehicle location and the vehicle location corresponding to the revised shift history. The driver may then be presented with the option of reloading the revised shift history back into the transmission controller. In this manner, the vehicle and driver, do not have to re-create the shift history and revised shift programming each time the vehicle returns.

Further, in another exemplary aspect, the revised shift history and associated transmission shift control program may be transferred between vehicles. In this manner, any vehicle having the capability of receiving that shift control program may be able to identify a current vehicle location and the driver of that vehicle may be provided the option of using a shift history, which has been revised in accordance with the present disclosure by another vehicle, in the driver's own vehicle. In this manner, other vehicles and drivers may be provided with the benefit of an optimized and calibrated shift programming which may be specific for each race track, as identified through vehicle location data.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system for a vehicle, the system comprising:
    an engine for generating torque for propelling the vehicle;
    a transmission selectively coupled to the engine for receiving torque from the engine and having a plurality of gear selections each of which have a gear ratio which converts the torque from the engine to an output torque;
    a vehicle location identifier that identifies a location of the vehicle and provides a vehicle location signal indicating a location of the vehicle; and
    a controller that is programmed to:
        record a shift history comprising gear selection, duration of gear selection, and vehicle location of each gear selection;
        identify a gear selection having a duration less than a predetermined duration; and
        revise a shift parameter for a gear selection having a duration less than the predetermined duration.

2. The system of claim 1, wherein the shift parameter is based upon one of an engine speed, vehicle speed, a vehicle acceleration, an accelerator pedal position, a brake pedal position, and a steering angle input.

3. The system of claim 2, wherein the shift parameter comprises an engine speed.

4. The system of claim 3, wherein the controller identifies having a duration less than a predetermined duration by identifying a gear selection that reduces a gear ratio and which has a duration less than a predetermined duration before a gear selection that increases a gear ratio.

5. The system of claim 1, wherein revising a shift parameter comprises providing a shift parameter revision in the shift history corresponding to a vehicle location of the identified gear selection having a duration less than the predetermined duration.

6. The system of claim 5, wherein the controller is further programmed to:
    determine when the vehicle location returns to the identified vehicle location corresponding to the shift parameter revision;
    revise a shift parameter based upon the shift parameter revision while the vehicle is at the identified vehicle location corresponding to the shift parameter revision; and
    control a gear ratio selection in the transmission based upon the revised shift parameter while the vehicle is at the identified vehicle location corresponding to the shift parameter revision.

7. The system of claim 5, wherein the shift parameter revision comprises an engine speed offset value.

8. The system of claim 7, wherein the engine speed offset value is less than a difference between an engine speed shift point and an engine speed rev limit.

9. The system of claim 7, wherein the controller is further programmed to calculate the engine speed offset value based upon one of a vehicle speed, engine speed, gear ratio, and duration of the gear selection.

10. The system of claim 1, wherein the controller is further programmed to determine whether the vehicle is in a predetermined performance mode and wherein the controller records a shift history, identifies gear selections, and revises shift parameters only when the controller determines that the vehicle is in the predetermined performance mode.

11. The system of claim 1, wherein the vehicle location identifier comprises a receiver of a global positioning system.

12. The system of claim 1, wherein the controller is further programmed to initiate recording of the shift history in response to a driver input.

13. The system of claim 1, wherein the vehicle location identifier comprises a vehicle transponder configured to identify a position of the vehicle on a track.

14. A method for controlling a vehicle propulsion system, the system including an engine for generating torque for propelling the vehicle, a transmission selectively coupled to the engine for receiving torque from the engine and having a plurality of gear selections each of which have a gear ratio which converts the torque from the engine to an output torque, a vehicle location identifier that identifies a location of the vehicle and provides a vehicle location signal indicating a location of the vehicle, the method comprising:
- recording a shift history comprising gear selection, duration of gear selection, and vehicle location of each gear selection;
- identifying a gear selection having a duration less than a predetermined duration; and
- revising a shift parameter for a gear selection having a duration less than the predetermined duration.

15. The method of claim 14, wherein identifying a gear selection having a duration less than a predetermined duration comprises identifying a gear selection that reduces a gear ratio and which has a duration less than a predetermined duration before a gear selection that increases a gear ratio.

16. The method of claim 14, wherein revising a shift parameter comprises providing a shift parameter revision in the shift history corresponding to a vehicle location of the identified gear selection having a duration less than the predetermined duration.

17. The method of claim 16, further comprising:
- determining when the vehicle location returns to the identified vehicle location corresponding to the shift parameter revision;
- revising a shift parameter based upon the shift parameter revision while the vehicle is at the identified vehicle location corresponding to the shift parameter revision; and
- controlling a gear ratio selection in the transmission based upon the revised shift parameter while the vehicle is at the identified vehicle location corresponding to the shift parameter revision.

18. The method of claim 16, wherein the shift parameter revision comprises an engine speed offset value.

19. The method of claim 14, wherein the vehicle location identifier comprises one of a receiver of a global positioning system and a vehicle transponder configured to identify a position of the vehicle on a track.

20. The method of claim 14, wherein recording the shift history is in response to receiving a driver input.

* * * * *